United States Patent [19]

Meares

[11] 4,395,751
[45] Jul. 26, 1983

[54] FLUX-BALANCED VARIABLE FREQUENCY INVERTER

[75] Inventor: Lawrence G. Meares, Rancho Palos Verdes, Calif.

[73] Assignee: McDonnell Douglas Corporation, Long Beach, Calif.

[21] Appl. No.: 303,780

[22] Filed: Sep. 21, 1981

[51] Int. Cl.³ .................... H02M 7/537; H02P 13/12
[52] U.S. Cl. ....................................... 363/134; 363/75
[58] Field of Search .............................. 363/22-26, 363/75, 90-93, 95, 97, 133-134

[56] References Cited

U.S. PATENT DOCUMENTS

| | | | |
|---|---|---|---|
| 2,967,989 | 1/1961 | Eno et al. | 363/23 |
| 3,161,837 | 12/1964 | Lloyd | 363/133 X |
| 3,196,335 | 7/1965 | Williams, Jr. | 363/26 |
| 3,414,801 | 12/1968 | Bishop et al. | 363/132 |
| 4,005,352 | 1/1977 | Kugler et al. | 363/93 X |

Primary Examiner—William M. Shoop
Assistant Examiner—Peter S. Wong
Attorney, Agent, or Firm—Gregory A. Cone; George W. Finch; Donald L. Royer

[57] ABSTRACT

Replacing the timing core of a conventional two-core inverter with a magnetic amplifier allows for control of frequency and for B-H loop symmetry. Switching of the magnetic amplifier results in inverter commutation rather than the familiar pulse width modulation.

6 Claims, 13 Drawing Figures

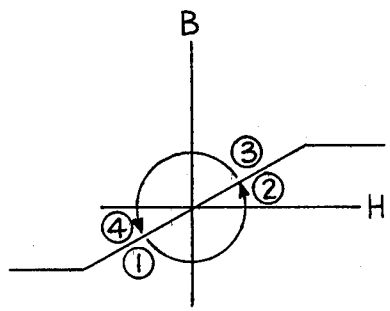
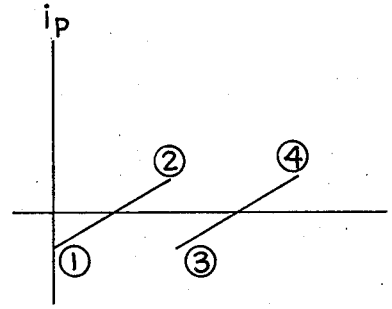
FIG. 7a  FIG. 7b
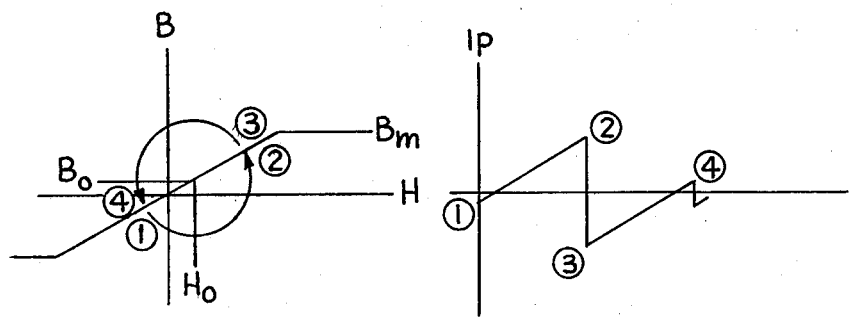
FIG. 8a  FIG. 8b
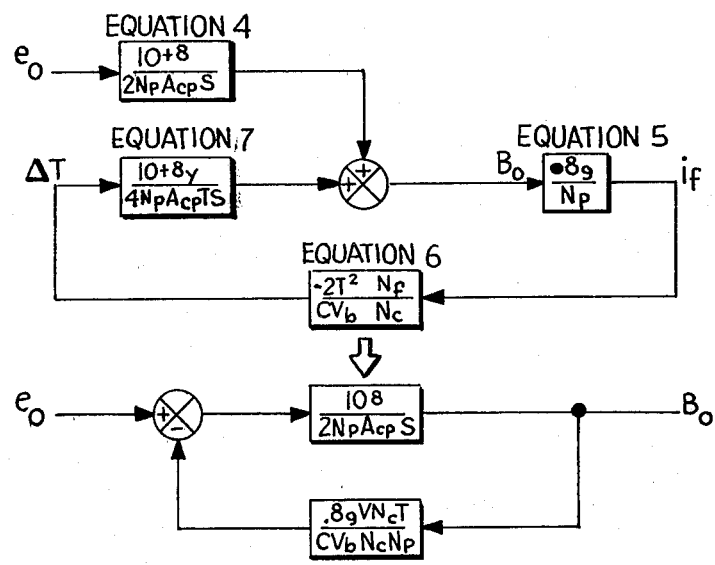
FIG. 9

FLUX-BALANCED VARIABLE FREQUENCY INVERTER

BACKGROUND OF THE INVENTION

1. Field of the Invention

This invention relates to DC to AC inverters and to voltage controlled oscillators.

2. Description of the Prior Art

Modern switching power supplies that use bipolar junction transistors require a source of power to drive the base circuit of the power switch. The following characteristics are generally required: a power range of one to ten watts; transformer isolation; and variable frequency. Most prior devices use a saturable reactor to control frequency. However, varying of the output frequency can only be accomplished by changing the input voltage to the device. Additionally the range of control is severely limited because the output power is also modulated. Although a variety of integrated and discrete circuit techniques are currently utilized as the control element for the base circuit drive, these circuits tend to be extremely complex because they not only require a drive transformer and discrete transistors, but also need additional circuits to control frequency.

One such device is described in U.S. Pat. No. 3,217,171 to P. D. Corey for a "Variable Frequency Oscillator." This reference combines a magnetic coupled multivibrator and a saturable reactor wherein the control winding of the saturable reactor is connected to a DC control signal which varies the frequency of the multivibrator as a function of the amplitude of the DC control signal. However, this reference does not include the magnetic amplifier nor the novel feedback means of the present invention by which the flux excursions in the output transformer are balanced to prevent saturation.

U.S. Pat. No. 3,223,945 to W. E. Damon describes a "Controllable Frequency Magnetically Coupled Multivibrator." This rather complex implementation is directed towards circumventing the perceived requirement for a low impedance control source for the multivibrator. In any event, the construction of the reference device is significantly different in almost all respects from that of the present invention.

SUMMARY OF THE INVENTION

The basic framework of this invention is that of a conventional two-core inverter, with the timing core being replaced with a magnetic amplifier. The two magnetic amplifier gate windings are configured to alternately saturate their cores such that a large back bias is applied to turn the transistor switches of the inverter off. Flux feedback is accomplished by connecting the power core of the inverter to the magnetic amplifier core assembly through a control winding resistor. Additionally, feedback windings about the magnetic amplifier core assembly in the input power circuit are used to balance the flux excursions in the output transformer to prevent its saturation.

BRIEF DESCRIPTION OF THE DRAWINGS

FIG. 7 portrays two graphs which display the operating characteristics for a balanced B-H loop;

FIG. 8 shows two graphs which display the operating characteristics for an unbalanced B-H loop;

FIG. 9 is a block diagram showing the operation of the B-H balancing mechanism.

DETAILED DESCRIPTION OF THE INVENTION

Figure 1:
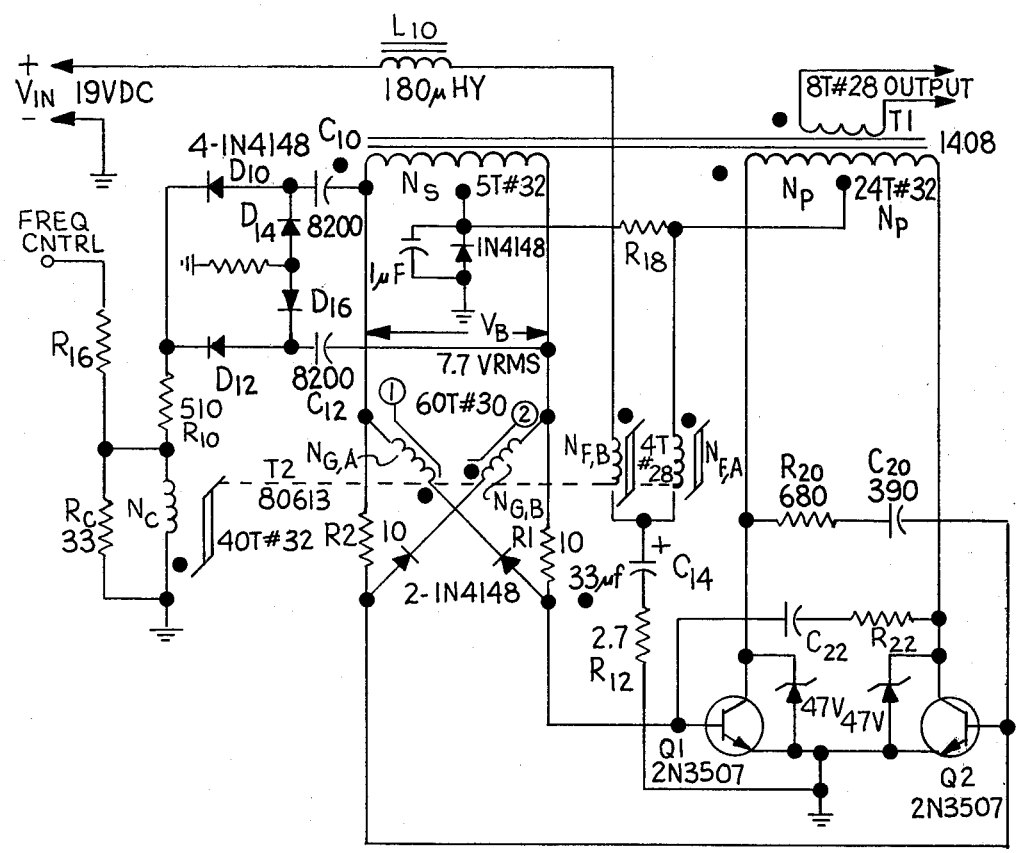
FIG. 1 is a detailed schematic diagram of one embodiment of this invention.

This circuit combines the simplicity of the two-core inverter with the controllability of a solid-state voltage controlled oscillator (VCO). The circuit can be used in a variety of power conversion systems which include: a. the control element in resonant converters; b. low power DC-AC converters; c. variable or controlled phase inverters using phase lock techniques. FIG. 1 shows a detailed schematic diagram of one embodiment of the invention, herein a production circuit used for a 1.7 kilowat inverter base drive. The values and part numbers for the individual components of this particular embodiment are as shown in FIG. 1. T2 in particular is a square saturable $\frac{1}{8}$ mil permalloy core. The two magnetic amplifier gate windings $N_{G,A}$ and $N_{G,B}$ are configured to alternately saturate each core so that a large back bias is applied to turn the transistor switches Q1 and Q2 off. (Flux is coupled by connecting the two cores of the mag amp through the control winding resistor $R_C$). Feedback windings $N_{F,A}$ and $N_{F,B}$ in the input power circuit are used to balance the flux excursions in the output transformer to prevent saturation.

Figure 2A:
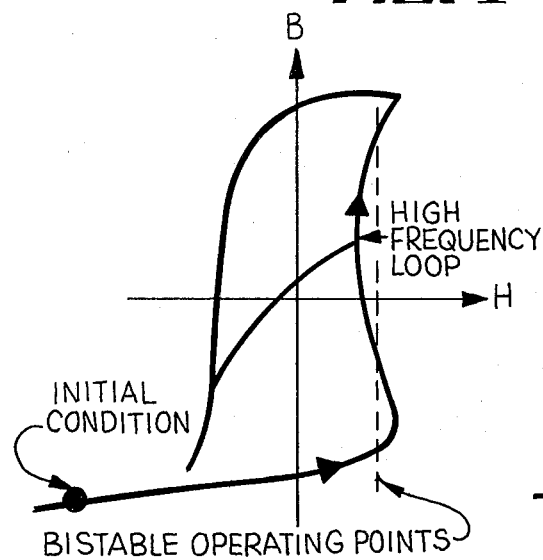
FIG. 2 portrays two graphs which describe the flux conditions within the magnetic amplifier cores.
Figure 2B:
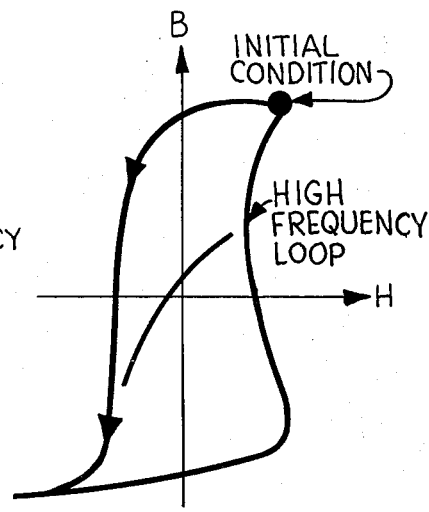

Circuit operation is understood by assuming that the inverter has just commutated such that Vb is positive with a magnetic amplifier flux condition shown in FIG. 2. These B-H loops describe the square wave voltage excited mode which is relatively independent of frequency. The control winding couples core 1 and core 2 of the magnetic amplifier together so that core 1 flux is coupled to core 2 as long as both cores are in a high permeability region. As core 1 is driven toward saturation, the flux in core 1 is transferred to core 2 of the magnetic amplifier core assembly T2. When saturation occurs, the base drive at Q1 will be reversed along with Q2 until Q1 turns off. As Q1 turns off, the cross-connected collector-base R-C network, comprising $R_{20}$, $R_{22}$, $C_{20}$, and $C_{22}$, causes Q2 to turn on and reinforces the Q1 turnoff. This condition propagates through the magnetics and the new state is sustained. Since the flux coupling is not perfect, it is necessary to provide a DC current in the control winding $N_C$ of the magnetic amplifier to make up for gain losses. It should be noted that the magnetizing current increases, as seen in FIG. 2, as frequency is increased. This reduces flux coupling which requires additional control current to reset the core. Unfortunately, this is the same requirement needed to reduce frequency (increase core reset current) so that a bistable condition occurs, allowing the VCO to operate at either very small or very large flux excursions.

Figure 3:
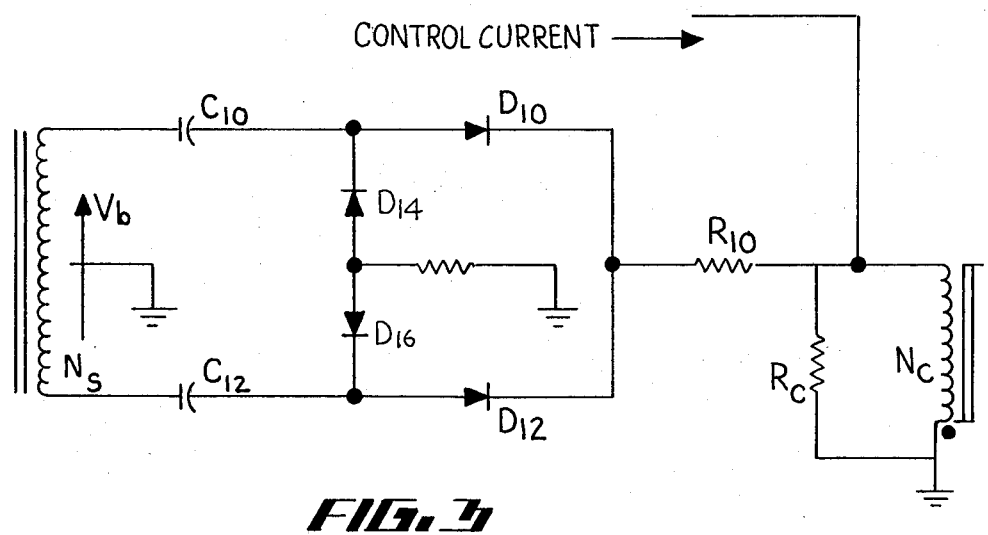
FIG. 3 is a portion of the detailed schematic diagram of FIG. 1 showing the frequency sensitive feedback portion of the circuit.

However, the undesired bistable operation can be prevented by feeding back a control current proportional to frequency on each half cycle through the frequency sensitive feedback circuit shown in FIG. 3. If the RC time constant is short compared to operating frequency, F, the average current feedback is:

$$i = (dq/dt) = C*(V_b/2)*(2F) = CV_bF \qquad (1)$$

Figure 4:
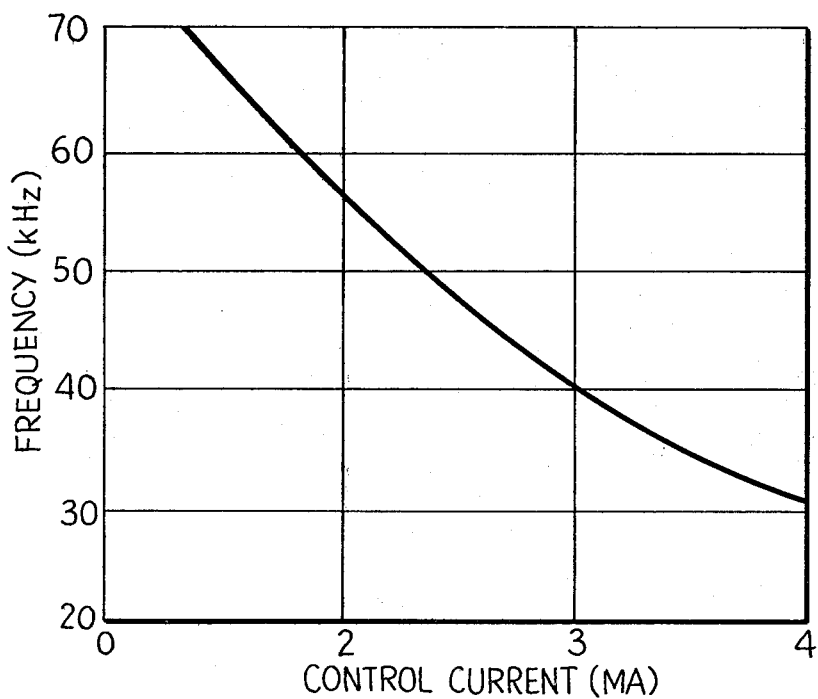
FIG. 4 is a graph showing the control current-frequency relationship.

This makes the current large compared to the frequency sensitive core loss and thus linearizes the control. The result is that the frequency is a linear function of control current as seen in FIG. 4. Under some circumstances it is also desirable to eliminate the bistable characteristics by flux coupling through an RC network instead of a resistor; however, the control current would then change period instead of frequency, an effect which is undesirable for this embodiment.

Figure 5:
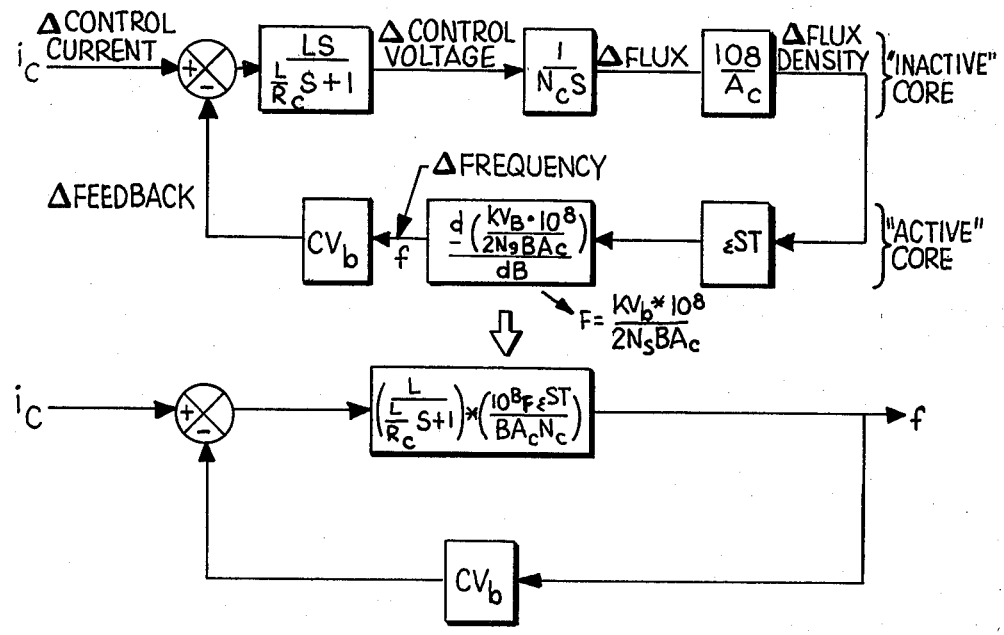
FIG. 5 is a block diagram showing the small signal control characteristics.

Small signal control characteristics are derived from the block diagram shown in FIG. 5. Circuit behavior can be analyzed for small changes about an operating point, and all losses are assumed small compared to the feedback current.

The following terms are introduced into the block diagram:
$KV_b$—voltage applied to the mag-amp gate winding
L—control winding inductance
T—period of ½ cycle
S—Laplace operator
Ac—mag-amp core cross section in cm$^2$.

If it is further assumed that the flux coupling resistor (Rc) is small, the circuit is characterized as a first-order system with:

Steady state gain:

$$1/CV_b \qquad (2)$$

Bandwidth:

$$W(-3db) = \frac{2R_cF^2CN_g}{KN_c} \qquad (3)$$

Figure 6:
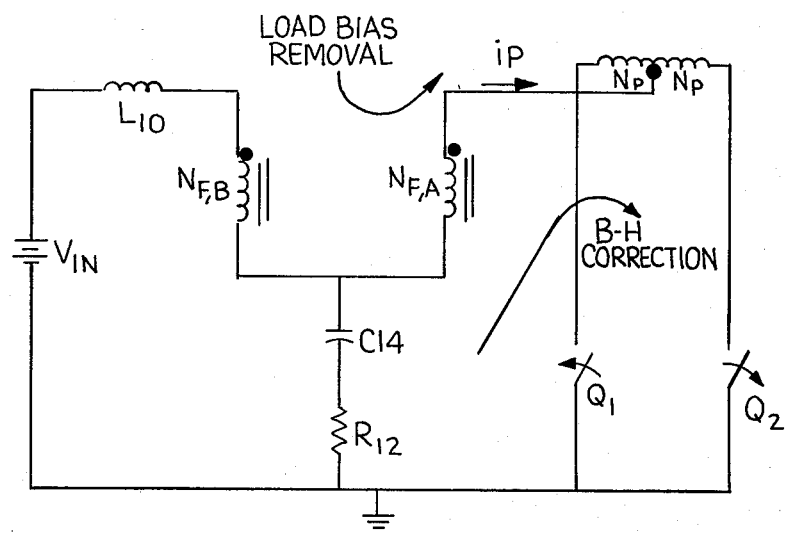
FIG. 6 is another portion of the detailed schematic diagram of FIG. 1 showing the B-H loop balancing from the magnetic amplifier.

Using two feedback windings, $N_{F,A}$ and $N_{F,B}$, connected in opposing directions as shown in FIG. 6 eliminates the control winding bias due to load changes and balances the B-H loop. L10 and C14 provide filtering necessary to allow bias removal without defeating the B-H correction. Notice that this correction assumes the load does not contain a DC component since such a load would cause unwanted timing corrections. The resistor R12 in series with C14 is used to damp the LC resonance so that an unwanted feedback from the source, $V_{in}$, will not have high gain.

The B-H loop unbalance or run-up is caused by an asymmetry in either amplitude or period of the voltage applied to the output transformer. An initially balanced condition is assumed as shown in FIG. 7. An unbalance is then introduced as shown in FIG. 8. The offset, Bo, will grow with time in accordance with the equation:

$$Bo = \frac{10^8}{N_pA_{cp}} \int \frac{e_o}{2} dt \qquad (4)$$

$e_o$ = difference in applied voltage on each ½ cycle
$N_p$ = turns across which $e_o$ is applied
$A_{cp}$ = core cross section cm$^2$ of $N_p$.

From the graph and the above equation, it can be seen that without any correction Bo will grow to saturation for any unbalanced condition.

If the input current (ip) of FIG. 6 is applied to a magnetic amplifier winding ($N_F$), a B-H correction will be developed each one half cycle that will adjust the symmetry of oscillation in a manner that reduces Bo. The following equations describe that process:

$$i_f = \int_1^2 i_p dt - \int_3^4 i_p dt = \frac{0.8\, Bo\, l}{N_p} \qquad (5)$$

$$\approx \frac{0.8\, Bo\, g}{N_p}$$

where:
$i_f$ = effective control current
$l$ = TI path length in cm
$\mu$ = TI permeability
$g$ = TI gap in cm
$N_p$ = TI primary turns Expressing Equation (1) in terms of ½ cycle period, T, and accounting for the turns ratio between control and feedback windings yields:

$$\frac{dt}{di_f} = \frac{-2T^2}{CV_b} \frac{N_f}{N_c} \qquad (6)$$

The period is held constant over one full cycle so that the correction, Bo, is:

$$\Delta Bo = \tfrac{1}{2}\left[\frac{10^8}{2N_pA_{cp}}\left(\int_1^2 Vdt - \int_3^4 Vdt\right)\right]$$

$$= \frac{VT*10^8}{2N_pA_{cp}}$$

where $\Delta T$ is the control of symmetry each ½ cycle and $$Bo(t) \cong \frac{\Delta Bo}{2T} dt \qquad (7)$$

$$\cong \frac{V*10^8}{2N_pA_{cp}} \frac{\Delta T}{2T} dt$$

These equations are put together in block diagram form in FIG. 9.

The steady-state solution for Bo is:

$$\frac{Bo}{e_o} \quad \frac{CV_cN_cN_p}{0.8g\, VN_f} \qquad (8)$$

and the correction bandwidth is $$W(-3db) = \frac{0.4*10^8 g\, VN_fT}{C V_b N_c N_p^2 A_{cp}} \qquad (9)$$

Figure 10:
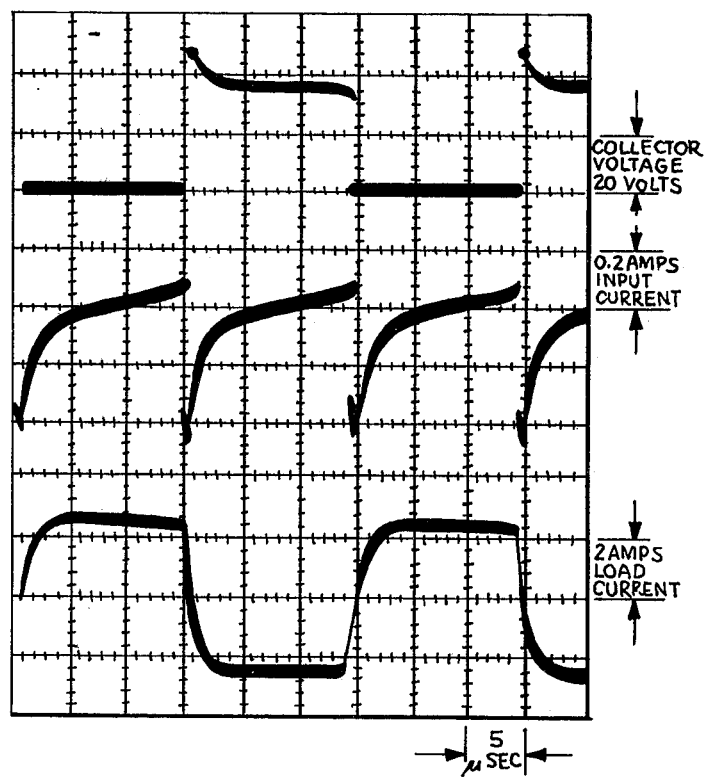
FIG. 10 is a graph showing typical wave forms in the circuit as displayed on an oscilloscope.

The wave forms described in FIG. 10 show the operation of the B-H balancing mechanism in this particular circuit. The upper set of waveforms represent the collector-to-base voltage across either Q1 or Q2 as a function of time. The middle set of waveforms shows the behavior of the input current (ip in FIG. 6) as a function of time. The bottom set of waveforms shows the resulting load current as a function of time through a load, not shown, across the output terminals of the power transformer of the inverter.

The flux balanced variable frequency inverter has simultaneously solved the problem of core saturation due to component imperfections and has provided a method of frequency control that does not compromise performance.

I claim:

1. In a two-core inverter comprising two transistor switches, a power core and a timing core, the improvement comprising a flux-balanced, variable frequency inverter wherein the timing core of the two-core inverter is replaced by a magnetic amplifier assembly comprising a control core assembly having two cores which are connected with a control winding; said inverter further comprising:
   a control current feedback means connected between a frequency-proportional control current source and the control winding of the magnetic amplifier; and,
   a flux excursion balancing means comprising two separate feedback magnetic amplifier windings about the control core assembly of the magnetic amplifier connected in opposing directions between an input DC voltage source and a center tap on the input side of an output transformer on the power core of the inverter.

2. The inverter of claim 1 wherein the control current feedback means comprises a secondary winding on the power core of the inverter connected through a resistive element to one side of the control winding of the magnetic amplifier.

3. The inverter of claim 1 wherein the flux excursion balancing means further comprises: the first feedback winding of the two feedback windings connected between the center tap of the input side of the output transformer of the inverter and a first node; the second feedback winding of the two feedback windings connected between a first side of an inductive element and the first node, the other side of the inductive element being connected to a first side of the input DC voltage source; the first node connected to a second node through a resistive element and a capacitive element; the end taps of the input side of the output transformer connected in parallel through the two transistor switches to the second node; and the second node connected to the other side of the DC voltage source.

4. A flux balanced, variable frequency inverter comprising:
   two transistor switches, a power core assembly which comprises a set of primary windings comprising a center tapped input winding and an output winding, and a magnetic amplifier assembly which comprises a core assembly having two cores having a common control winding and separate gate windings;
   a control current feedback means connected between a frequency-proportional control current source and the control winding of the magnetic amplifier; and
   a flux excursion balancing means comprising first and second separate feedback windings about the cores of the magnetic amplifier core assembly connected in opposing directions between an input DC voltage source and a center tap on the input winding of the power core assembly.

5. The inverter of claim 4 wherein the control current feedback means comprises a center-tapped secondary winding on the power core of the inverter the end taps of which are connected through a resistive element to one side of the control winding of the magnetic amplifier and the center tap of which is connected to the center tap of the input winding of the power core.

6. The inverter of claim 4 wherein the flux excursion balancing means further comprises the first feedback winding connected between a center tap on the input winding on the power core assembly and a first node; the second feedback winding connected between a first side of an inductive element and the first node, the other side of the inductive element being connected to a first side of the input DC voltage source; the first node connected to a second node through a resistive element and a capacitive element; the end taps of the input winding on the power core connected in parallel through the two transistor switches to the second node; and the second node connected to the other side of the DC voltage source.

* * * * *